United States Patent

[11] 3,622,550

[72] Inventors Anargiros Pete Patellis
Rostraver Township, Westmoreland County;
John F. Holohan, Jr., Mount Lebanon Township, Allegheny, both of Pa.
[21] Appl. No. 873,126
[22] Filed Oct. 31, 1969
[45] Patented Nov. 23, 1971
[73] Assignee Pennsylvania Industrial Chemical Corporation

[54] COPOLYMERS OF ALPHA PINENE AND CERTAIN SUBSTITUTED BUTADIENES AND PROCESS OF PREPARATION
5 Claims, No Drawings

[52] U.S. Cl........................................................ 260/82.1, 260/93.3
[51] Int. Cl........................................................ C08d 3/06, C08d 3/10
[50] Field of Search............................................ 260/82.1, 93.3

[56] References Cited
UNITED STATES PATENTS

| 2,487,898 | 11/1949 | Rummelsburg | 260/82.1 |
| 3,470,145 | 9/1969 | Lipman | 260/897 |
| 3,478,007 | 11/1969 | Barkley et al. | 260/88.2 |
| 3,299,170 | 1/1967 | Gonzenbach | 260/846 |

*Primary Examiner*—Joseph L. Schofer
*Assistant Examiner*—Richard A. Gaither
*Attorney*—Buell, Blenko & Ziesenheim

ABSTRACT: A process for producing resinous copolymers of alpha pinene and certain substituted butadienes which comprises contacting a mixture of monomers of alpha pinene and a substituted butadiene selected from the group consisting of isoprene and piperylene with a cocatalyst consisting essentially of aluminum chloride and an organosilicon compound in an inert diluent. The copolymers are characterized by a high softening point, good resistance to color degradation by heat and the ability to impart cohesive strength in coating and adhesive applications.

COPOLYMERS OF ALPHA PINENE AND CERTAIN SUBSTITUTED BUTADIENES AND PROCESS OF PREPARATION

This invention relates to a process for producing resinous copolymers of alpha pinene and one or more diolefins; more particularly, to the copolymerization of alpha pinene and certain substituted butadienes in the presence of a cocatalyst system comprising aluminum chloride and an organosilicon compound.

It is known that terpenes such as alpha pinene may be polymerized in the presence of a cocatalyst system comprising aluminum chloride and certain organosilicon compounds to produce high yields of resin having good color and high softening point. Such a process is described in U.S. application Ser. No. 520,918 now U.S. Pat. No. 3,478,007, wherein a solution of trialkyl silicon halide and aluminum chloride in an inert solvent is first formed, followed by the addition of alpha pinene to the solution and the recovery of a solid polymer of alpha pinene. However, this process requires that the reactants and the solvent be dried before carrying out the polymerization reaction; otherwise the yield of resin produced is diminished and high softening points cannot be achieved.

We have discovered a process for producing a resin which exhibits properties equal to those of the straight terpene resins and therefore may be used in applications where heretofore only the terpene or other hydrocarbon resins were found suitable. At the same time, the present process has distinct advantages over the known processes for producing terpene polymer resins. These advantages will be detailed hereinbelow.

Our process involves the copolymerization of alpha pinene and certain substituted butadienes by contacting the mixture of monomers with a cocatalyst consisting essentially of aluminum chloride and an organosilicon compound. We have found that the inclusion of substituted butadiene monomers increases the yield of resin produced as compared with the polymerization of alpha pinene alone with a similar cocatalyst. We have also found that comparatively higher softening points may be achieved by the inclusion of the butadiene monomers. A further important advantage of the instant process is that the step of drying the reactants and solvent, which step is required before polymerizing alpha pinene alone, is eliminated.

We provide a process for copolymerizing monomers of alpha pinene and a substituted butadiene selected from the group consisting of isoprene and piperylene which comprises contacting a mixture of said monomers with catalytic amounts of a cocatalyst consisting essentially of aluminum chloride and an organosilicon compound selected from the group consisting of lower trialkyl-silicon chlorides, lower diakyl phenyl silicon halides and hexalower alkyl disiloxanes in an inert diluent; and recovering a resinous copolymer therefrom. Preferably, the mixture of monomers comprises from 5 to 50 percent substituted butadiene monomer. We further prefer to carry out the copolymerization reaction for a period of time between 25 minutes and 5 hours while maintaining the temperature in the range of about 10° to about 30° C.

We further provide a resinous product of the copolymerization of monomers of alpha pinene and a substituted butadiene selected from the group consisting of isoprene and piperylene, said copolymerization being carried out by contacting a mixture of said monomers with catalytic amounts of a cocatalyst consisting essentially of aluminum chloride and an organosilicon compound selected from the group consisting of lower trialkyl-silicon chlorides, lower diakyl phenyl silicon halides and hexalower alkyl disiloxanes in an inert diluent, said mixture of monomers comprising from 5 to 50 percent substituted butadiene monomer.

Suitable substituted butadienes which may be used in the process of the invention includes 2-methyl-1,3-butadiene (isoprene) and isomers of 1,3-pentadiene (piperylene). One or more of these compounds are commonly found in byproduct streams from petroleum cracking processes and these byproduct streams (sometimes called "$C_5$ streams") may provide a convenient and inexpensive source of diolefins for the process of the invention.

The reaction can be carried out successfully using mixtures containing from about 5 to 50 percent substituted butadiene monomer in the charge. Mixtures containing more than about 50 percent substituted butadiene form gel particles rather than the desired friable resinous copolymer.

The solvents which may be used in the process of the invention are the aromatics which are relatively inert to alkylation reactions. Benzene is preferred although methyl substituted benzenes such as toluene and xylene may also be used. Toluene and xylene are more reactive than benzene to the catalyst and tend to enter into the polymerization reaction to some extent. The amount of solvent used does not affect the reaction except that if the benzene is less than about 70 percent by weight of the feed mixture, the solution containing the resinous product exhibits high viscosity and therefore causes difficulty in handling. The use of benzene in amounts greater than about 150 percent by weight of the feed mixture is an inconvenience.

It will be apparent to those skilled in the art that the use of benzene as a solvent overcomes may of the shortcomings of the prior art processes utilizing solvents both aliphatic and aromatic. Halogenated solvents are more expensive, more difficult to handle because of their increased density and water solubility, and more difficult to recover than benzene.

The cocatalyst used in the process of the invention is a complex Friedel-Craft catalyst consisting essentially of aluminum chloride and an organosilicon compound. Preferably the organosilicon compound is a member of the group consisting of lower trialkyl-silicon chlorides, lower diakyl phenyl silicon halides and hexalower alkyl disiloxanes. Examples of these compounds are trimethylchlorosilane, phenyl dimethylchlorosilane and hexamethyldisiloxane. For the purposes of this invention, lower alkyl groups are taken to mean alkyl groups having one to 18 carbon atoms.

Trimethylchlorosilane is the preferred organosilicon compound for combining with aluminum chloride to form the cocatalyst of the present invention. 4 to 5 weight percent aluminum chloride and 1.2 to 1.4 weight percent trimethylchlorosilane (percentages based on weight of feed mixture) are the preferred amounts of the catalyst constituents for use in the invention. Lesser amounts (e.g., 2 percent aluminum chloride or 0.25 percent trimethylchlorosilane) result in lower product yields and greater amounts (e.g. 7 percent aluminum chloride or 2.0 percent trimethylchlorosilane) produce little or no increase in yield and have no effect upon the properties of the product.

Example I which follows illustrates preferred procedures in accordance with the present invention. All parts and percentages in the specification and claims are by weight unless otherwise indicated.

EXAMPLE I

A 500 ml. three-neck flask equipped with an agitator, thermometer, addition funnel and gas inlet is purged with nitrogen. A slow nitrogen purge is maintained throughout the reaction. 5 grams of aluminum chloride (technical grade) is slurried in 50 grams of benzene in the reaction vessel. 1.3 grams of trimethylchlorosilane (supplied by Dow Chemical Co.) is added immediately. The temperature is adjusted to 10° C. $\pm 1°$ C., and is maintained in that range throughout the reaction by means of an alcohol-dry ice bath. A mixture containing 60 grams of alpha pinene, 40 grams of isoprene and 50 grams of benzene is placed in the addition funnel and added dropwise to the catalyst slurry in the reaction vessel over a period of 25 to 35 minutes. After the monomer addition is completed, the reaction mixture is stirred for 4 hours while maintaining the temperature at 10°±1° C. The catalyst is deactivated by adding 40 to 50 grams of water to the reaction mixture. The resinous product is washed three times with water to remove catalyst residues. The solvent together with any oils formed during polymerization are removed by distillation. 93 grams of resin having a softening point (Ring and Ball) of 125° C. are recovered.

The temperature which was maintained in the foregoing example I was 10°±1° C. but this may be varied within a range between about 10° and about 30° C., as shown in example II below.

EXAMPLE II

Using the procedures and equipment of example I, the following reactants in the quantities indicated were employed in the process of the invention:

| | |
|---|---|
| aluminum chloride | 5 grams |
| benzene (to form slurry) | 50 grams |
| trimethylchlorosilane | 1.3 grams |
| alpha pinene | 55 grams |
| isoprene | 45 grams |
| benzene (with monomers) | 50 grams | the temperature maintained during the monomer addition period of 25 to 35 minutes was 30°±1° C. The reaction mixture was stirred for 4 hours while maintaining the temperature at 30°±1° C. 92.4 grams of resin having a softening point of 121° C. were recovered.

EXAMPLE III

Using the procedures and equipment of example I, the following reactants in the quantities indicated were employed in the process of the invention:

| | |
|---|---|
| aluminum chloride | 5 grams |
| benzene (to form slurry) | 50 grams |
| hexamethyldisiloxane | 1.5 grams |
| alpha pinene | 55 grams |
| isoprene | 45 grams |
| benzene (with monomers) | 50 grams |

The temperature maintained during the monomer addition period of 25 to 35 minutes was 10°±1° C. The reaction mixture was stirred for 4 hours while maintaining the temperature at 10°±1° C. 91.3 grams of resin having a softening point of 136° C. were recovered.

As mentioned above, an increase in the amount of isoprene in the feed mixture causes an increase in yield and in softening point of the resin produced. Table I below illustrates data obtained from runs using the procedures set forth in example I but varying the ratio of alpha pinene to isoprene in the feed. These runs were made using 5.0 percent aluminum chloride, 1.3 percent trimethylchlorosilane, a reaction temperature of 10°±1 C. and benzene as a diluent.

TABLE I

| Feed | | Product | |
|---|---|---|---|
| Alpha Pinene (%) | Isoprene (%) | Yield (%) | Softening Pt. (°C.) |
| 100 | 0 | 75 | 115 |
| 85 | 15 | 81 | 115 |
| 67 | 33 | 90 | 115 |
| 60 | 40 | 93 | 125 |
| 55 | 45 | 95 | 135 |

Generally, only small amounts of the catalysts relative to the amount of monomers are needed to carry out the copolymerization reaction. We have found that an increase in the amount of aluminum chloride up to about 5.0 percent will result in an increase in the softening point of the resin. The data shown in table II illustrate this relationship. The data in table II was obtained from runs using the procedures set forth in example I and in particular 60 parts of alpha pinene, 40 parts of isoprene, 1.3 percent trimethylchlorosilane, a reaction temperature of 10°±1° C. and benzene as a diluent.

TABLE II

| % Aluminum Chloride | Yield (%) | Softening Pt. (°C.) |
|---|---|---|
| 3.0 | 95 | 110 |
| 4.0 | 95 | 115 |
| 4.5 | 95 | 120 |
| 5.0 | 95 | 122 |

The ratio of the organosilicon constituent to aluminum chloride may vary within wide limits. Preferably, a weight ratio of one part organosilicon constituent to 5 parts aluminum chloride is used. Those skilled in the art will readily be able to determine the optimum ratio.

Example IV below illustrates the use of a mixture of substituted butadienes in the copolymerization reaction with the alpha pinene in accordance with the present invention.

EXAMPLE IV

While example I describes the use of isoprene in the copolymerization with alpha pinene, other $C_5$ dienes may be used equally as well. As stated above, a convenient source of $C_5$ dienes is the byproduct stream from certain petroleum cracking processes. Two such streams (designated "A" and "B") were used in the polymerization procedure described in example I. The streams, consisting principally of isomers of 1,3-pentadiene (piperylene), analyzed as follows:

| | Stream A | Stream B |
|---|---|---|
| Constituent | % | % |
| Isoprene | 0.2 | 0.2 |
| 2-Methylbutene-2 | 0.2 | 0.1 |
| Trans-Piperylene | 25.1 | 72.3 |
| Cis-Piperylene | 60.8 | 14.2 |
| Cyclo Pentene | 13.6 | 13.0 |
| Unidentified | 0.1 | 0.2 |
| | 100.0 | 100.0 |

Runs were made in which first, alpha pinene and the constituents of Stream A were copolymerized with and without trimethylchlorosilane cocatalyst; and second, alpha pinene and the constituents of Stream B were copolymerized with and without trimethylchlorosilane cocatalyst. The results of these runs, tabulated below, illustrate not only the operability of the process using other substituted butadienes but also the effect of the cocatalyst system:

| Feed composition, parts of— | | | Aluminum chloride (percent) | Trimethylchlorosilane (percent) | Yield of 100° C. softening point resin (parts) |
|---|---|---|---|---|---|
| Alpha pinene | Stream A | Stream B | | | |
| 50 | 50 | | 5.0 | 1.3 | 92.8 |
| 50 | 50 | | 5.0 | 0 | 85.2 |
| 80 | 20 | | 5.0 | 1.3 | 78.3 |
| 80 | 20 | | 5.0 | 0 | 63.0 |
| 80 | | 20 | 5.0 | 1.3 | 76.5 |
| 80 | | 20 | 5.0 | 0 | 64.9 |

Table III below also illustrates the effectiveness of the organosilicon compound as a cocatalyst. The data shown in table III were obtained from runs in which the ratio of alpha pinene to isoprene monomers was varied while also varying the amount of trimethylchlorosilane used as a cocatalyst. In all runs, the following were constant: 5.0 percent aluminum chloride catalyst, 10°±° C. reaction temperature and benzene diluent.

TABLE III

| Feed composition | | Percent trimethylchlorosilane cocatalyst | | | | |
|---|---|---|---|---|---|---|
| Parts alpha pinene | Parts isoprene | 0 | 0.86 | 1.29 | 1.46 | 1.72 |
| 67 | 33 | 75% yield 87° C.S.P. | | 95% yield 111° C.S.P. | | |
| 60 | 40 | | 95% yield 107° C.S.P. | 95% yield 122° C.S.P. | 95% yield 121° C.S.P. | 95% yield 123° C.S.P. |
| 55 | 45 | 89.8% yield 129° C.S.P. | 93.7% yield 135° C.S.P. | 93.6% yield 138° C.S.P. | | |

While the foregoing examples are directed to a "batch-type" process, the process may also be carried out on a continuous basis.

The alpha pinene/isoprene copolymer resin is useful in coatings and adhesives and may advantageously replace terpene and other hydrocarbon resins in those applications. For example, in a pressure sensitive adhesive consisting of natural rubber and resin, the alpha pinene/isoprene copolymer resin imparts greater cohesive strength to the adhesive mass than do the terpene and other hydrocarbon resins while retaining equivalent tack and adhesive properties. Table IV below illustrates this advantage by comparing the results of standard tests run on two samples of pressure sensitive adhesives, one prepared with straight alpha pinene polymer resin having a softening point of 125° C., and the other with alpha pinene/isoprene copolymer resin having a softening point of 126° C. produced from 60 parts alpha pinene and 40 parts isoprene according to the process of the present invention.

TABLE IV

| Resin | Quickstick (tack) strength oz./in. width | Adhesive strength oz./in. width | Cohesive Strength Minutes to Slip 0 35 oz./in. width |
|---|---|---|---|
| alpha pinene polymer | 34 | 55 | 700 |
| alpha pinene/ isoprene copolymer | 20 | 52 | 2660 |

The resin produced according to the present invention may be used as a component of hot melt coatings. Example V is illustrative of this application.

EXAMPLE V

A hot melt compound of the following composition was prepared:

| | Parts |
|---|---|
| 126° C. S.P. alpha pinene/isoprene copolymer resin | 15 |
| Ethylene/vinyl acetate copolymer | 15 |
| 115° F. M.P. paraffin wax | 60 |
| 180° F. M.P. microcrystalline wax | 10 |
| antioxidant (butylated hydroxy toluene) | 0.1 |

The hot melt compound was coated on 40 lb. basis weight machine-glazed Kraft paper by conventional coating methods at a coating weight of 15 lb./3000 ft.$^2$. Moisture vapor transmission rate tests of the coated paper at 90 percent relative humidity and 100° F. yield the following:

| Flat | 0.2 g./m.$^2$/24 hrs. |
|---|---|
| Creased | 0.6 g./m.$^2$/24 hrs. |

In hot melt coating applications, where the coating compound is subject to prolonged holding at or repeated heating to the molten state, alpha pinene/isoprene resin exhibits greater resistance to color degradation by heat than a straight alpha pinene polymer resin.

We claim:

1. A process for producing resinous copolymers of alpha pinene and a substituted butadiene selected from the group consisting of isoprene and piperylene comprising the steps of:
   A. forming a slurry of catalytic amounts of a cocatalyst consisting essentially of aluminum chloride and an organosilicon compound selected from the group consisting of lower trialkyl-silicon chlorides, lower dialkyl phenyl silicon halides and hexalower alkyl disiloxanes in benzene, the alkyl radicals of said organosilicon compound each having from one to 18 carbon atoms inclusive;
   B. adding a mixture of monomers of alpha pinene and a substituted butadiene selected from the group consisting of isoprene and piperylene to said slurry; and
   C. recovering a resinous copolymer of said monomers.

2. A process as recited in claim 1 wherein:
said mixture of monomers comprises from 5 to 50 percent substituted butadiene monomer.

3. A process as recited in claim 2 wherein said cocatalyst slurry is maintained in contact with said mixture of monomers for a period of time ranging between 25 minutes and 5 hours at a temperature in the range of about 10° C. to about 30° C.

4. A process for producing resinous copolymers of alpha pinene and a substituted butadiene selected from the group consisting of isoprene and piperylene comprising the steps of:
   A. forming a slurry of catalytic amounts of a cocatalyst consisting essentially of aluminum chloride and trimethylchorosilane in benzene;
   B. adding a mixture of monomers of alpha pinene and a substituted butadiene selected from the group consisting of isoprene and piperylene to said slurry;
   C. recovering a resinous copolymer of said monomers.

5. A process for producing resinous copolymers of alpha pinene and a substituted butadiene selected from the group consisting of isoprene and piperylene comprising the steps of:
   A. forming a slurry of catalytic amounts of a cocatalyst consisting essentially of aluminum chloride and hexamethyldisiloxane in benzene;
   B. adding a mixture of monomers of alpha pinene and a substituted butadiene selected from the group consisting of isoprene and piperylene to said slurry; and
   C. recovering a resinous copolymer of said monomers.

* * * * *